(12) United States Patent
Kobayashi

(10) Patent No.: US 7,312,952 B2
(45) Date of Patent: Dec. 25, 2007

(54) THIN-FILM MAGNETIC HEAD FOR PERPENDICULAR MAGNETIC RECORDING

(75) Inventor: Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 102 days.

(21) Appl. No.: 11/396,029

(22) Filed: Mar. 31, 2006

(65) Prior Publication Data

US 2006/0171073 A1 Aug. 3, 2006

Related U.S. Application Data

(62) Division of application No. 10/637,310, filed on Aug. 8, 2003, now abandoned.

(30) Foreign Application Priority Data

Aug. 19, 2002 (JP) ............................. 2002-238320

(51) Int. Cl.
*G11B 5/187* (2006.01)
*B44C 1/22* (2006.01)
*G11B 5/127* (2006.01)

(52) U.S. Cl. .................. 360/126; 360/122; 29/603.15; 29/603.18; 29/603.12; 216/22

(58) Field of Classification Search .......... 29/603.15, 29/603.18, 603.12; 216/22, 51, 72; 360/122, 360/126
See application file for complete search history.

(56) References Cited

U.S. PATENT DOCUMENTS

| | | | |
|---|---|---|---|
| 5,916,423 A | 6/1999 | Westwood | |
| 6,903,900 B2 | 6/2005 | Sato et al. | |
| 7,181,828 B2 * | 2/2007 | Yazawa et al. | 29/603.12 |
| 7,186,348 B2 * | 3/2007 | Chen et al. | 216/22 |
| 2002/0006013 A1 | 1/2002 | Sato et al. | |
| 2002/0078553 A1 | 6/2002 | Sato | |
| 2002/0078554 A1 | 6/2002 | Kobayashi | |
| 2002/0080522 A1 | 6/2002 | Sato et al. | |
| 2002/0080523 A1 | 6/2002 | Sato et al. | |
| 2002/0080524 A1 | 6/2002 | Takahashi et al. | |
| 2002/0080525 A1 | 6/2002 | Sato et al. | |
| 2005/0264931 A1 * | 12/2005 | McFadyen | 360/126 |

FOREIGN PATENT DOCUMENTS

| | | |
|---|---|---|
| JP | 10105920 | 4/1998 |
| JP | 2000-197609 | 7/2002 |
| JP | 2002-216315 | 7/2002 |
| JP | 2003-203311 | 7/2003 |
| WO | WO 99/41739 | 8/1999 |

* cited by examiner

*Primary Examiner*—William J Klimowicz
(74) *Attorney, Agent, or Firm*—Brinks Hofer Gilson & Lione

(57) ABSTRACT

A thin-film magnetic head for perpendicular magnetic recording includes a nonmagnetic conductive elevation layer disposed under a main magnetic pole layer. The nonmagnetic conductive elevation layer and the main magnetic pole layer forms a trapezoidal shape converging toward an auxiliary magnetic pole layer, viewed from a face opposing a recording medium. The thin-film magnetic head for perpendicular magnetic recording includes an auxiliary magnetic pole layer, the main magnetic pole layer, and a nonmagnetic insulating layer disposed therebetween at a surface facing the recording medium.

6 Claims, 3 Drawing Sheets

THIN-FILM MAGNETIC HEAD FOR PERPENDICULAR MAGNETIC RECORDING

This application is a divisional application of U.S. application Ser. No. 10/637,310 filed on Aug. 8, 2003, now abandoned entitled "Thin-Film Magnetic Head For Perpendicular Magnetic Recording."

BACKGROUND OF THE INVENTION

1. Field of the Invention

The present invention relates to a thin-film magnetic head for perpendicular magnetic recording.

2. Description of the Related Art

As is well known, a thin-film magnetic head for perpendicular magnetic recording includes an auxiliary magnetic pole layer, a main magnetic pole layer (single magnetic pole), and a nonmagnetic insulating layer disposed therebetween at a surface facing a recording medium. The area of the main magnetic pole layer exposed on the surface facing the recording medium is sufficiently smaller than that of the auxiliary magnetic pole layer. The auxiliary magnetic pole layer and the main magnetic pole layer are magnetically coupled to each other at a section behind the surface facing the recording medium. A coil layer of which the center is located at the magnetically coupled section is embedded in the nonmagnetic insulating layer. Upon energizing of the coil layer, a recording magnetic field is induced between the auxiliary magnetic pole layer and the main magnetic pole layer. Then a leakage recording magnetic field between ends facing the recording medium of these magnetic pole layers permeates through a hard film perpendicularly and passes through a soft film of the recording medium and then back to the ends. Since the leakage recording magnetic field is concentrated on a small area of the end of the single magnetic pole, magnetic data is recorded in a portion facing the end of the main magnetic pole layer.

Accordingly, the smaller the area of the single magnetic pole viewed from an end face facing the recording medium is, the higher the recording density is. In general, the thin-film magnetic head for perpendicular magnetic recording is provided on a trailing edge of a head assembly, and mounted on a slider. The head assembly has a center of oscillation at the exterior of a recording medium that rotates. Accordingly, if the shape of the single magnetic pole viewed from the end facing the recording medium is a rectangle, fringing, caused by an oblique leakage magnetic field due to the difference in the oblique direction between an inner circumference and an outer circumference of the recording medium corresponding to the corners of the rectangle, is generated. The fringing causes a reduction in signal to noise ratio S/N during the recording and a servo error. Accordingly, the shape of the main magnetic pole layer viewed from the end facing the recording medium is a substantially trapezoidal shape converging toward the auxiliary magnetic pole layer. Unfortunately, an ideal substantially trapezoidal shape of the main magnetic pole layer is difficult to achieve in the conventional structure.

SUMMARY OF THE INVENTION

In view of the problems of the conventional thin-film magnetic head for perpendicular magnetic recording described above, it is an object of the present invention to provide a thin-film magnetic head for perpendicular magnetic recording that includes a main magnetic pole layer having a substantially trapezoidal shape converging toward the auxiliary magnetic pole layer, viewed from the end face facing the recording medium.

In a manufacturing process of a conventional thin-film magnetic head for perpendicular magnetic recording, a main magnetic pole having a substantially trapezoidal shape is formed and then side faces of the main magnetic pole are etched from the side face directions in order to provide a precise track width. During the etching process, particles rebounding from a plating underlayer are deposited on the lower part of the main magnetic pole. The inventor has found that such a phenomenon caused deformation of the trapezoidal shape of the main magnetic pole and has thus completed the present invention. In general, the etching rate of the plating underlayer is smaller than that of the main magnetic pole. Accordingly, when the lower part of the main magnetic pole is covered with particles rebounding due to the etching of the plating underlayer, a difference of the etching rate between the upper part and the lower part of the main magnetic pole is generated (that is, the etching rate of the upper part is relatively larger than that of the lower part), thereby deforming the ideal trapezoidal shape.

The present invention provides a thin-film magnetic head for perpendicular magnetic recording including an auxiliary magnetic pole layer; a main magnetic pole layer; and a nonmagnetic insulating layer disposed therebetween, the main magnetic pole layer having a substantially trapezoidal shape converging toward the auxiliary magnetic pole layer viewed from the face opposing a recording medium, wherein a nonmagnetic conductive elevating layer is disposed under the main magnetic pole layer, the nonmagnetic conductive elevating layer forming the trapezoidal shape with the main magnetic pole layer.

The nonmagnetic conductive elevating layer is disposed under the main magnetic pole layer. Therefore, even if the particles rebound from the plating underlayer during the etching from the side face direction, the particles that bounce back substantially do not reach and do not deposit on the main magnetic pole layer. Accordingly, the difference of the etching rate between the lower part and the upper part of the main magnetic pole is not generated, thereby achieving an ideal trapezoidal shape of the main magnetic pole layer.

A nonmagnetic conductive cover layer may be disposed on the main magnetic pole layer, which forms the trapezoidal shape with the main magnetic pole layer and the nonmagnetic conductive elevating layer. The formation of the nonmagnetic conductive cover layer can properly control the height of the main magnetic pole layer (the length in the stacking direction) and form the precise main magnetic pole layer.

According to the present invention, in a method for making a main magnetic pole of a thin-film magnetic head for perpendicular magnetic recording, wherein the main magnetic pole layer is formed on an auxiliary magnetic pole layer and a nonmagnetic insulating layer is disposed therebetween, the main magnetic pole layer has a substantially trapezoidal shape converging toward the auxiliary magnetic pole layer viewed from a face opposing a recording medium, the method includes a step of forming a plating underlayer on the nonmagnetic insulating layer; a step of forming a resist layer on the plating underlayer, the resist layer having a trapezoidal groove; a step of forming a nonmagnetic conductive elevating layer and then the main magnetic pole layer by plating in the trapezoidal groove formed in the resist layer; a step of removing the resist layer; and a step of etching the exposed side faces of the nonmagnetic conductive elevating layer and the main magnetic pole layer, both of which form the substantially trapezoidal shape, and the plating underlayer.

Furthermore, in the step of forming the nonmagnetic conductive elevating layer and then the main magnetic pole layer in the trapezoidal groove by plating, after forming the main magnetic pole layer a nonmagnetic conductive cover layer may be formed in the trapezoidal groove by plating.

The nonmagnetic conductive elevating layer preferably has a thickness of at least 50 nm such that particles rebounding from the plating underlayer do not reach the main magnetic pole layer. The nonmagnetic conductive elevating layer and the nonmagnetic conductive cover layer are preferably composed of NiP, Au, NiW, NiMo, NiPd, NiCr, Pd, Cr or Cu. The main magnetic pole layer may be composed of NiFe—X (wherein X represents at least one component selected from the group consisting of Tc, Ru, Rh, Pd, Re, Os, Ir, Pt, and S), FeCo—X' (wherein X' represents at least one component selected from the group consisting of Pd, Pt, Ru, Ir, Ni, Cr, and Rh), or FeCo.

DESCRIPTION OF THE PREFERRED EMBODIMENTS

Figure 1:
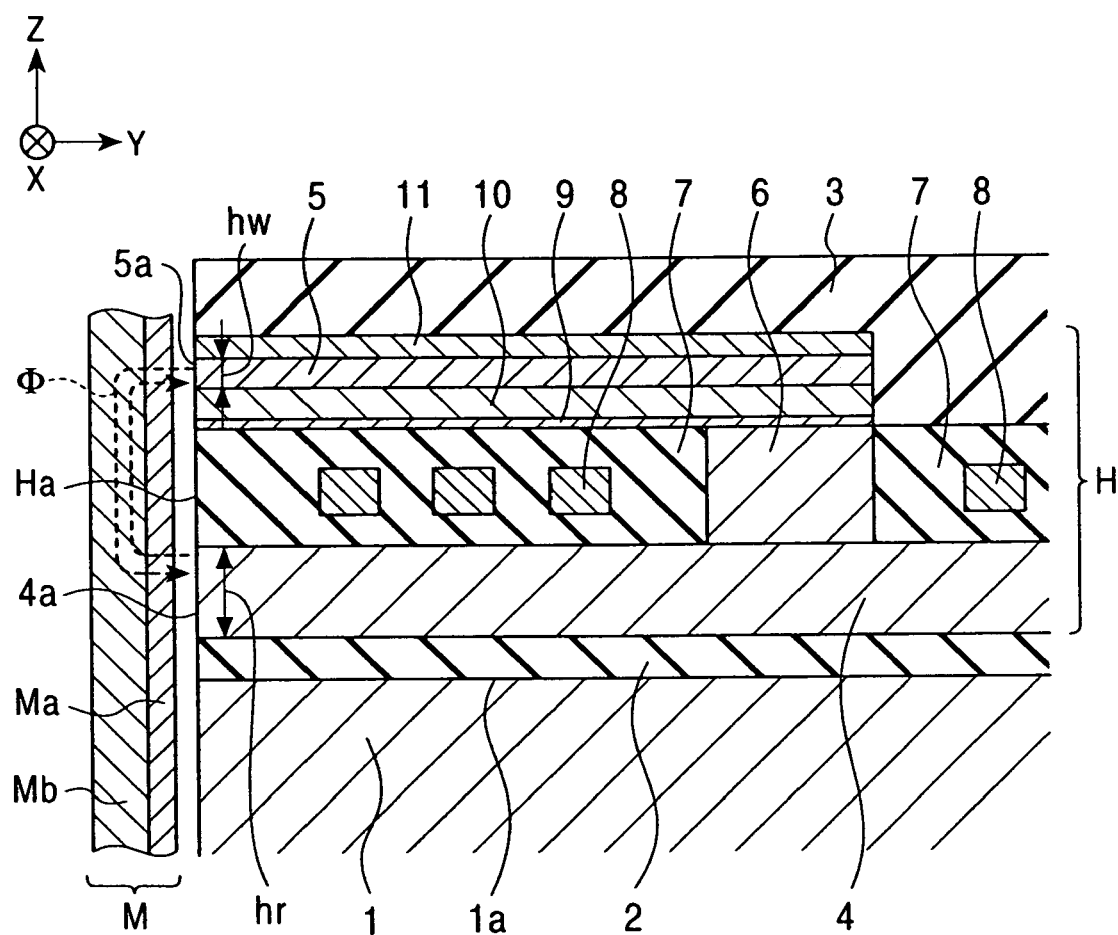
FIG. 1 is a partial sectional view of a layered structure of a perpendicular magnetic recording head of the present invention, viewed from a leakage magnetic field direction from a recording medium.
Figure 2:
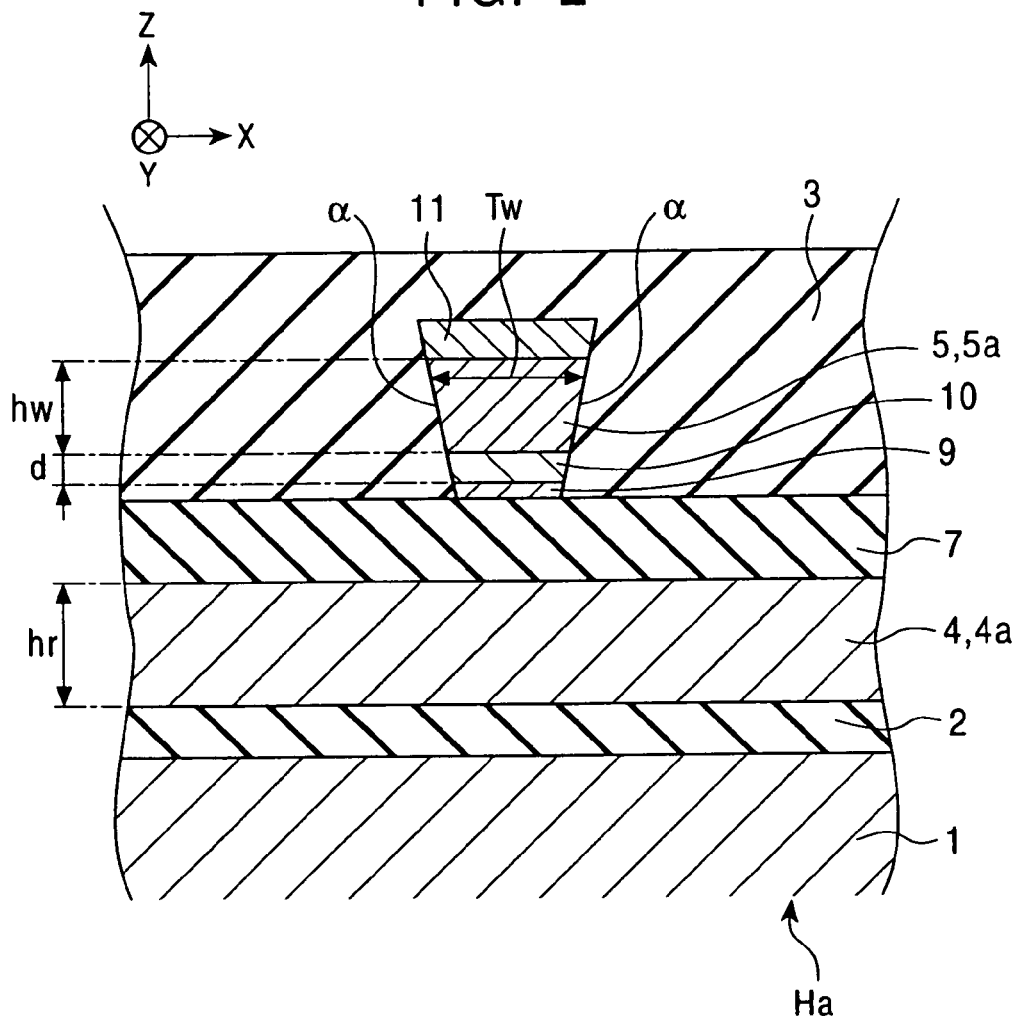
FIG. 2 is a partial sectional view of a layered structure of the perpendicular magnetic recording head shown in FIG. 1, viewed from a surface facing the recording medium.

FIG. 1 is a partial sectional view of a layered structure of a perpendicular magnetic recording head H of the present invention, viewed from a leakage magnetic field direction from a recording medium M. The X direction, the Y direction, and the Z direction in FIGS. 1 and 2 are defined as a track width direction, the leakage magnetic field direction from the recording medium M, and a moving direction of the recording medium M, respectively. The recording medium M includes a hard film Ma having high remanence on the surface of the recording medium M, and a soft film Mb having a high magnetic permeability in the inner portion.

The perpendicular magnetic recording head H is disposed between a nonmagnetic insulating layer 2 and a protective layer 3 at the side face 1a of the slider 1, which is mounted on a hard disk drive. The nonmagnetic insulating layer 2 and the protective layer 3 are composed of an inorganic material, such as $Al_2O_3$ or $SiO_2$.

The perpendicular magnetic recording head H includes an auxiliary magnetic pole layer 4 composed of a ferromagnetic material such as a permalloy (NiFe) and a main magnetic pole layer 5 remote from the auxiliary magnetic pole layer 4. The main magnetic pole layer 5 is composed of a ferromagnetic material as in the auxiliary magnetic pole layer 4, and is preferably composed of NiFe—X (wherein X represents at least one component selected from the group consisting of Tc, Ru, Rh, Pd, Re, Os, Ir, Pt, and S), FeCo—X' (wherein X' represents at least one component selected from the group consisting of Pd, Pt, Ru, Ir, Ni, Cr, and Rh), or FeCo. The auxiliary magnetic pole layer 4 and the main magnetic pole layer 5 are magnetically coupled to each other at a magnetic coupling section 6 behind the opposing face Ha facing the recording medium M.

Referring to FIG. 2, an end face 4a of the auxiliary magnetic pole layer 4 and an end face 5a of the main magnetic pole layer 5 are exposed at the opposing face Ha facing the recording medium M. The end face 5a of the main magnetic pole layer 5 has a trapezoidal shape converging toward the auxiliary magnetic pole layer 4. The thickness hw of the end face 5a of the main magnetic pole layer 5 is smaller than the thickness hr of the end face 4a of the auxiliary magnetic pole layer 4. The track width Tw, that is, the width of the end face 5a in the track width direction is smaller than the width of the end face 4a of the auxiliary magnetic pole layer 4. Accordingly, the area of the end face 5a of the main magnetic pole layer 5 is smaller than the area of the end face 4a of the auxiliary magnetic pole layer 4.

A nonmagnetic insulating layer 7 is disposed between the auxiliary magnetic pole layer 4 and the main magnetic pole layer 5. A coil layer 8 composed of a conductive material, such as Cu, is embedded in the nonmagnetic insulating layer 7. Upon energizing of the coil layer 8, a recording magnetic field is induced between the auxiliary magnetic pole layer 4 and the main magnetic pole layer 5. Then a leakage recording magnetic field Φ between the end face 4a of the auxiliary magnetic pole layer 4 and the end face 5a of the main magnetic pole layer 5 permeates through the hard film Ma perpendicularly and then passes through the soft film Mb of the recording medium M. As described above, since the end face 5a of the main magnetic pole layer 5 has an area smaller than that of the end surface 4a of the auxiliary magnetic pole layer 4, the magnetic flux is concentrated on a portion of the recording medium facing the end face 5a of the main magnetic pole layer 5, so that magnetic data is recorded on the hard film Ma at the portion opposed to the end face 5a. A plating underlayer 9 composed of a magnetic material or a nonmagnetic material is provided at a portion corresponding to the area for the main magnetic pole on the nonmagnetic insulating layer 7 and the magnetic coupling section 6.

Referring to FIG. 2, an elevating layer 10 is disposed between the plating underlayer 9 and the main magnetic pole layer 5 in the perpendicular magnetic recording head H. The elevating layer 10 and the main magnetic pole layer 5 form a trapezoidal shape at the opposing face Ha. The elevating layer 10 is disposed in order to fill a gap in the Z direction between the main magnetic pole layer 5 and the plating underlayer 9. The elevating layer 10 preferably has a thickness d of at least 50 nm. When the main magnetic pole layer 5 and the elevating layer 10 are etched from side face directions (from inclined faces α), the elevating layer 10 prevents particles rebounding from the plating underlayer 9 from reaching the main magnetic pole layer 5. Therefore, the etched particles are not deposited on the main magnetic pole layer 5. Accordingly, both the upper part and the lower part of the main magnetic pole layer 5 can be etched at the same etching rate, thereby achieving an ideal trapezoidal shape (a trapezoidal shape converging toward the auxiliary magnetic pole layer 4) and the track width Tw.

The elevating layer 10 is preferably composed of a nonmagnetic conductive material and an etching rate thereof is larger than, or the same as that of the main magnetic pole layer 5. Specifically, the elevating layer 10 may be composed of NiP, Au, NiW, NiMo, NiPd, NiCr, Pd, Cr, or Cu. The etching rate of the elevating layer 10 is larger than that of the main magnetic pole layer 5. Therefore, a difference of the etching rate between the elevating layer 10 and the main magnetic pole layer 5 is not so large, even if the particles rebounding from the plating underlayer 9 covers the lower part of the elevating layer 10 during etching from the side face direction.

Furthermore, according to the present embodiment, a nonmagnetic conductive trimming cover layer 11 (a nonmagnetic conductive cover layer) is disposed on the main magnetic pole layer 5. The trimming cover layer 11 is a protective layer for preventing the upper part of the main magnetic pole layer 5 from being etched during etching from the side face direction. The trimming cover layer 11 is composed of a nonmagnetic conductive material, and an etching rate thereof is larger than, or the same as that of the main magnetic pole layer 5. Preferably, the trimming cover layer 11 may be composed of NiP, Au, NiW, NiMo, NiPd, NiCr, Pd, Cr, or Cu, as in the elevating layer 10. The trimming cover layer 11 ensures an accurate thickness hw of the end face 5a of the main magnetic pole layer 5.

Figure 3:
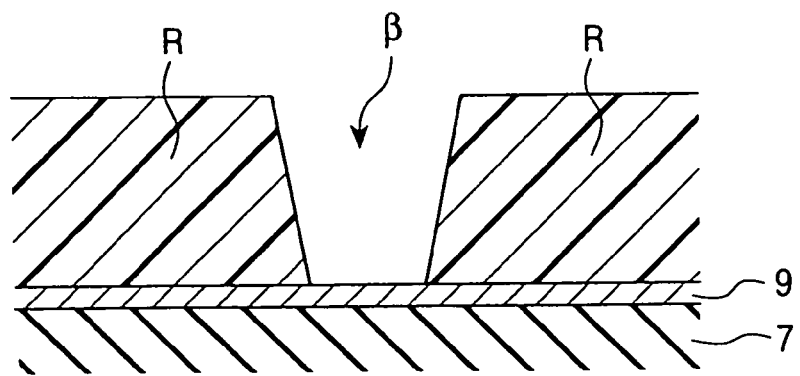
FIG. 3 is a cross-sectional view for illustrating a step in a method for making a main magnetic pole layer shown in FIG. 2.
Figure 4:
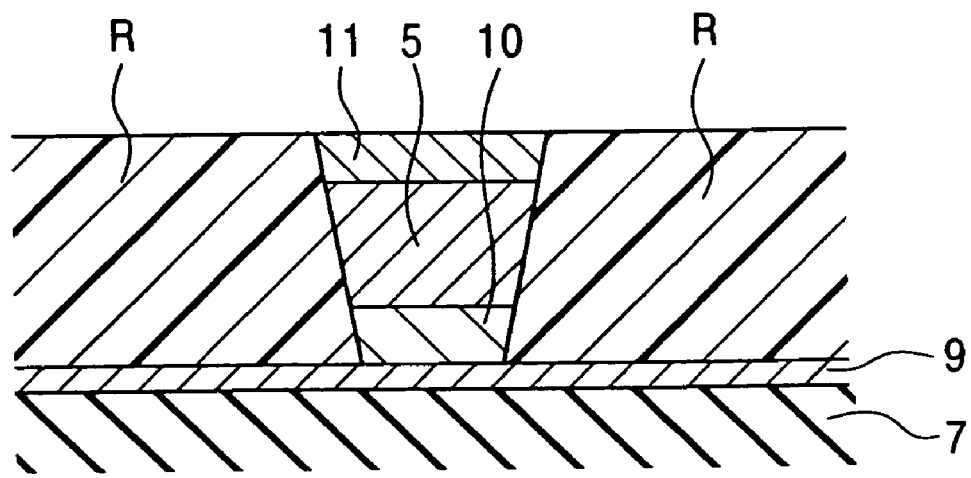
FIG. 4 is a cross-sectional view for illustrating the subsequent step to FIG. 3.
Figure 5:
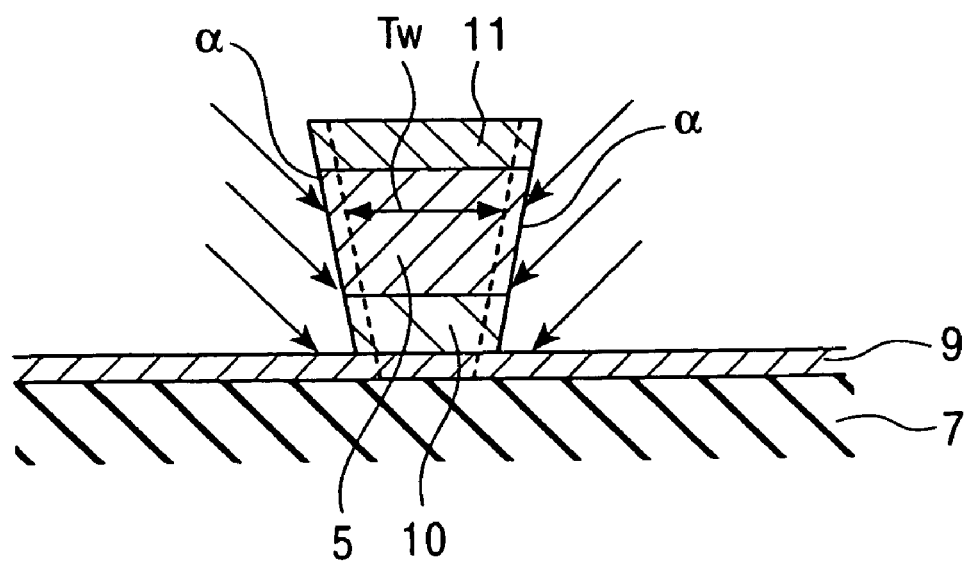
FIG. 5 is a cross-sectional view for illustrating the subsequent step to FIG. 4.

The manufacturing process of the main magnetic pole layer 5 shown in FIG. 2 will now be described with reference to FIGS. 3 to 5. FIGS. 3 to 5 are partial sectional views, viewed from the surface Ha facing the recording medium M. Since the nonmagnetic insulating layer 2, the protective layer 3, the auxiliary magnetic pole layer 4, the magnetic coupling section 6, and the nonmagnetic insulating layer 7 are formed by conventional steps, these steps are not described. Steps subsequent to the step of the formation of the nonmagnetic insulating layer 7 will now be described. The upper surfaces of the magnetic coupling section 6 and the nonmagnetic insulating layer 7 are substantially planarized by chemical mechanical polishing (CMP).

The plating underlayer 9 composed of a magnetic material such as NiFe is formed at a position corresponding to the area for the main magnetic pole on the magnetic coupling section 6 and the nonmagnetic insulating layer 7. A nonmagnetic material may be also used for the plating underlayer 9. Then, referring to FIG. 3, a resist layer R is formed on the plating underlayer 9 and a trapezoidal groove β is formed by patterning the resist layer R.

Referring to FIG. 4, the nonmagnetic conductive elevating layer 10, the main magnetic pole layer 5 of a ferromagnetic material, and the nonmagnetic conductive trimming cover layer 11 are formed as one in the trapezoidal groove β by plating. The elevating layer 10 preferably has a thickness of at least 50 nm such that the etched particles are surely not deposited on the main magnetic pole layer in the following etching from the side face direction.

The main magnetic pole layer 5 is composed of NiFe—X (wherein X represents at least one component selected from the group consisting of Tc, Ru, Rh, Pd, Re, Os, Ir, Pt, and S), FeCo—X' (wherein X' represents at least one component selected from the group consisting of Pd, Pt, Ru, Ir, Ni, Cr, and Rh), or FeCo. Etching rates of the elevating layer 10 and the trimming cover layer 11 are larger than or the same as that of the main magnetic pole layer 5. According to an embodiment, if the main magnetic pole layer 5 is mainly composed of a permalloy, the component of the elevating layer 10 and the trimming cover layer 11 may be NiP, Au, NiW, NiMo, NiPd, NiCr, Pd, Cr, or Cu.

Referring to FIG. 5, the resist layer R is removed and the elevating layer 10, the main magnetic pole layer 5, and the trimming cover layer 11 substantially forming a trapezoidal shape are exposed. The inclined faces α of the substantially trapezoidal shape consist of side faces of the elevating layer 10, the main magnetic pole layer 5, and the trimming cover layer 11.

Then, the side faces (the inclined faces α) of the elevating layer 10, the main magnetic pole layer 5, and the trimming cover layer 11 and the plating underlayer 9 are etched by side etching to remove the unwanted part of the plating underlayer 9 and to form a precise shape of the main magnetic pole layer 5. The etching in the side face direction provides a precise dimension of the main magnetic pole layer 5 in the track width direction (i.e. the track width Tw). According to the present embodiment, ion milling is employed for the etching in order to achieve a more precise shape. According to FIG. 5, arrows indicate the etching directions.

During the etching process, particles formed by etching falls on the plating underlayer 9 and bounce back. Since the elevating layer 10 is disposed between the main magnetic pole layer 5 and the plating underlayer 9 in the present embodiment, particles that bounce back substantially do not reach the main magnetic pole layer 5. Accordingly, the entire main magnetic pole layer 5 can be milled at a uniform etching rate, thereby readily achieving the trapezoidal shape converging toward the auxiliary magnetic pole layer 4. The elevating layer 10 is composed of a material whose etching rate is larger than, or the same as that of the main magnetic pole layer 5. Accordingly, the difference in the etching rate between the elevating layer 10 and the main magnetic pole layer 5 is decreased, even though the particles rebounding from the plating underlayer 9 are deposited on the elevating layer 10.

Since the upper surface of the main magnetic pole layer 5 is protected by the trimming cover layer 11, the thickness hw of the end face 5a of the main magnetic pole layer 5 is not decreased during the etching from the side face direction, thereby appropriately providing the height of the main magnetic pole layer 5.

After completion of the etching from the side face direction, the protective layer 3 composed of an inorganic material such as $Al_2O_3$ or $SiO_2$ is deposited over the trimming cover layer 11 and the nonmagnetic insulating layer 7. The protective layer 3 covers the periphery of the plating underlayer 9, the elevating layer 10, the main magnetic pole layer 5, and the trimming cover layer 11. As described above, the main magnetic pole layer 5 of the perpendicular magnetic recording head H shown in FIG. 2 is formed.

According to the present embodiment, the trimming cover layer 11, which functions as a protective layer, is formed on the main magnetic pole layer 5. If a precise control of the height of the main magnetic pole layer 5 is not required, the trimming cover layer 11 is not formed.

According to the embodiment illustrated above, components other than the characteristics of the present invention (the vicinity of the main magnetic pole layer) are illustrated by the simplest structure. However, the embodiments of the present invention are not limited to the above application and various modifications are possible. For example, a reading section having a magnetoresistive-effect device may be disposed between the slider 1 and the nonmagnetic insulating layer 2.

What is claimed is:

1. A method of manufacturing a thin-film magnetic head for perpendicular magnetic recording including a main magnetic pole layer having a substantially trapezoidal shape converging downward as viewed from a face opposing a recording medium, the method comprising:

forming a plating underlayer on a nonmagnetic insulating layer;

forming a resist layer on the plating underlayer so that the resist layer has a groove having the trapezoidal shape;

forming a nonmagnetic conductive elevating layer and the main magnetic pole layer in that order by plating in the trapezoidal groove;

removing the resist layer; and etching the exposed side faces of the nonmagnetic conductive elevating layer and the main pole layer and the plating underlayer.

2. The method of claim 1, further comprising forming a nonmagnetic conductive cover layer in the trapezoidal groove by plating after forming the main magnetic pole layer.

3. The method of claim 2, wherein the nonmagnetic conductive cover layer comprises at least one of NiP, Au, NiW, NiMo, NiPd, NiCr, Pd, Cr, or Cu.

4. The method of claim 1, wherein the nonmagnetic conductive elevating layer has a thickness of at least 50 nm.

5. The method of claim 1, wherein the nonmagnetic conductive elevating layer comprises at least one of NiP, Au, NiW, NiMo, NiPd, NiCr, Pd, Cr, or Cu.

6. The method of claim 1, wherein the main magnetic pole layer comprises at least one of:

NiFe—X wherein X represents at least one component selected from the group consisting of Tc, Ru, Rh, Pd, Re, Os, Ir, Pt, and S;

FeCo—X' wherein X' represents at least one component selected from the group consisting of Pd, Pt, Ru, Ir, Ni, Cr, and Rh; or FeCo.

* * * * *